United States Patent
Matthias et al.

(10) Patent No.: US 11,154,957 B2
(45) Date of Patent: Oct. 26, 2021

(54) METHOD FOR CROSS-WEDGE ROLLING POPPET VALVES

(71) Applicant: FEDERAL-MOGUL VALVETRAIN GMBH, Barsinghausen (DE)

(72) Inventors: Thorsten Matthias, Hannover (DE); Antonius Wolking, Barsinghausen (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 193 days.

(21) Appl. No.: 16/485,923

(22) PCT Filed: Oct. 26, 2017

(86) PCT No.: PCT/EP2017/077403
§ 371 (c)(1),
(2) Date: Aug. 14, 2019

(87) PCT Pub. No.: WO2018/149518
PCT Pub. Date: Aug. 23, 2018

(65) Prior Publication Data
US 2020/0039008 A1 Feb. 6, 2020

(30) Foreign Application Priority Data
Feb. 15, 2017 (DE) .................. 10 2017 103 042.5

(51) Int. Cl.
*B23P 15/00* (2006.01)

(52) U.S. Cl.
CPC .................. *B23P 15/002* (2013.01)

(58) Field of Classification Search
CPC ........... B23P 15/002; B21H 1/18; B21B 1/20; B21K 1/22; B21K 1/24
See application file for complete search history.

(56) References Cited

FOREIGN PATENT DOCUMENTS

| CN | 101856706 A | * 10/2010 |
| CN | 104924028 A | * 9/2015 |
| CN | WO 2016/179780 A1 | 11/2016 |
| DE | 19905038 B4 | 2/2008 |
| DE | 102012209187 A1 | 12/2012 |
| DE | 102012104413 A1 | 5/2013 |
| EP | 0709552 B1 | 5/1996 |

(Continued)

OTHER PUBLICATIONS

Machine Translation of CN104924028A. "Precise Forming Method for Automobile Engine Hollow Valve Blank with Core Bar". Sep. 23, 2015. Liu Jinping et al. (Year: 2015).*

(Continued)

*Primary Examiner* — David P Bryant
*Assistant Examiner* — Nirvana Deonauth
(74) *Attorney, Agent, or Firm* — Robert L. Stearns; Dickinson Wright, PLLC

(57) ABSTRACT

The invention relates to a method for producing poppet valves, the method including: cross-wedge rolling a preform (2), which has at least one disk portion (4) and a shaft portion, to produce a valve blank (10), wherein a diameter of the shaft portion (6) is reduced substantially to a shaft diameter of a shaft (16), and additionally a length of the shaft portion (6) is increased substantially to a length of the shaft (16) by means of a rolling-out process.

9 Claims, 3 Drawing Sheets

(56) References Cited

FOREIGN PATENT DOCUMENTS

JP          H05-57388 A      3/1993

OTHER PUBLICATIONS

Machine Translation of CN101856706A Method for Forming Automotive Engine Valve Blanks Accurately by Secondary Welding Cross Wedge Rolling). May 28, 2010. Zhenghuan Hu et al. (Year: 2010).*
Database WPI, Week 201101 Thomson Scientific, London, GB; AN2010-P14051 XP002777630, & CN101856706 A (Univ Beijing Sci & Technology) Oct. 13, 2010 Zusammenfassung; Abbildungen 1-4.
Databse WPI, Thomson Scientific, London, GB; AN 2015-665100 XP002777631, & CN 104924028A (Univ Beijing Science & Tech; Huaiji Dengyun Auto Parts Holding Co Ltd) Sep. 23, 2015 Zusammenfassung; Abbildungen 1-6, 10.
Database WPI Week 201546 Thomson Scientific, Long, GB; AN 2015-37444N XP002777632, & CN104 525800A (Univ Beijing Sci & Technology) Apr. 22, 2015 Zusammenfassung; Abbildungen 1-4.
Database WPI Week 201058 Thomson Scientific, London, GB; AN 2010-K65247 XP002777633, & CN 101786132 A (Univ Beijing Sci & Technology) Jul. 28, 2010 Zusammenfassung; Abbildungen 1-6.
Hongchao, Ji et. al.: Numerical analysis and experiment on cross wedge rolling and forging of engine valves. In: Journal of Materials Processing Technology 221 (2015) 233-242.

* cited by examiner

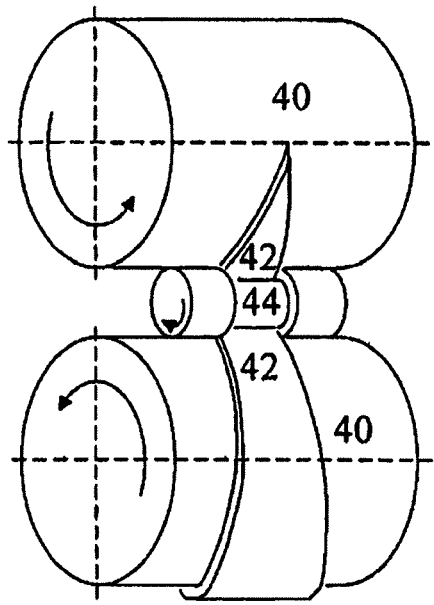
Fig. 1
Prior art
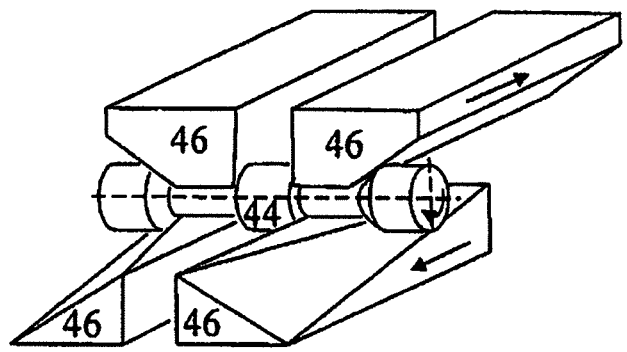
Fig. 2
Prior art
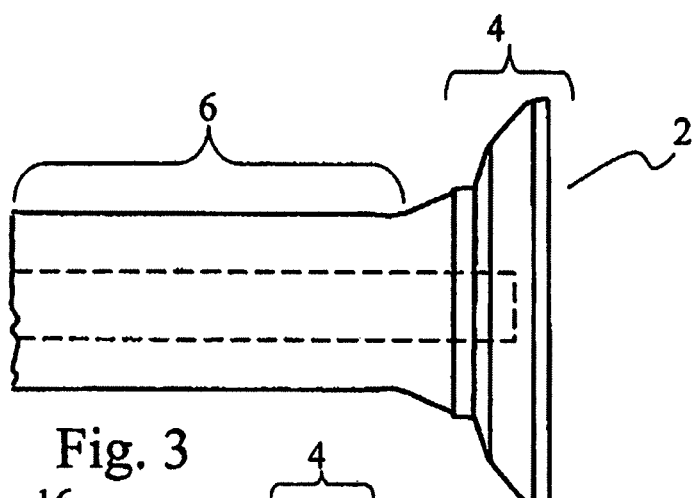
Prior art Fig. 3
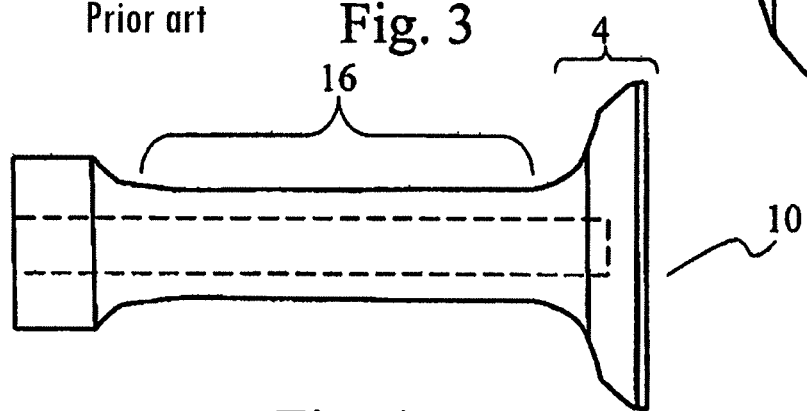
Fig. 4

METHOD FOR CROSS-WEDGE ROLLING POPPET VALVES

BACKGROUND

1. Technical Field

The present invention relates to a method for cross wedge rolling of disk valves. The present invention relates in particular to a method for cross wedge rolling of internally cooled disk valves.

2. Related Art

In the past, various methods have become known for manufacturing internally cooled disk valves. For example, a method for cross wedge rolling of disk valves is described in Thomson Scientific, London, GB; AN 2010-P14051 XP00277630 & CN101 856 706 A (Univ. Beijing CSI & Technology).

It has so far been very expensive to manufacture disk valves and in particular internally cooled disk valves because, first, a high precision is required and, second, the material used must have a sufficient strength at high temperatures to be able to withstand the loads due to combustion in a combustion chamber of an internal combustion engine. The usual machining production results in a great deal of material which must be melted down again subsequently. There are various known methods for manufacturing valves by pressing or forging. With the first internally cooled valves, the valve shaft was drilled out in the longitudinal direction. It is therefore desirable to have a method available for minimizing consumption, i.e., waste, of material in machining.

A method for manufacturing disk valves comprises cross wedge rolling of a preform to produce a valve blank. The preform comprises at least one disk section and one shaft section. The diameter of the shaft section is reduced essentially to the shaft diameter in cross wedge rolling, such that the length of the shaft section is also increased essentially to the shaft length by rolling during cross wedge rolling.

Since cross wedge rolling can create a torsional load for the preform in the rolling operation, it may not be necessary to roll the shaft diameter to the final dimension but instead it may be rolled to a slightly larger diameter, which is later reduced to the final diameter in the final processing. The larger diameter here amounts to 101% to 105% of the final diameter of the finished valve. The same thing is also true of the shaft length, wherein a larger diameter in the form of thickening on one end of the shaft is provided during cross wedge rolling, which exerts a force during cross wedge rolling that facilitates an increase in the shaft length during rolling. Final thickening may also offer a possibility for closing a longitudinal opening in the valve shaft running through the thickening of the end, for example, after sodium has been added as a coolant to such a cavity. The opening at the end can be sealed easily by rolling the thickened end to the shaft diameter. It is also possible to roll structures into the end of the shaft for engagement of conical pieces on the end of the shaft.

In another embodiment of this method, the shaft section of the preform is designed to be hollow. The hollow shaft section forms a cavity in the shaft section, which is to be retained even after cross wedge rolling. This embodiment relates to a manufacturing method for internally cooled valves. In cross wedge rolling of the preform, which has at least one disk section and one shaft section, to form a valve blank, a core or a supporting pin is preferably used to prevent the cavity from being closed by the rolling operation.

Another embodiment of the method for manufacturing disk valves uses a preform comprising two disk sections and two shaft sections, wherein the two disk sections are joined to one another, and the disk sections are preferably separated after machining the rolling surface after cross wedge rolling. An additional embodiment of the method for manufacturing disk valves uses two preforms that are in contact with one another at the disk sections, such that the two shaft sections extend outward, while the two preforms are arranged coaxially. The disk sections support one another in cross wedge rolling, such that the two disk surfaces remain essentially flat and smooth. In this embodiment, the two preforms need not be separated at the disk surfaces because they are already separate.

Another embodiment of the method for manufacturing disk valves comprises cross wedge rolling of preforms, whose shaft sections comprise a cavity that is open in the axial direction toward one end of the shaft. During cross wedge rolling, at least one core is arranged in each cavity to prevent the cavity from being compressed during cross wedge rolling and to ensure that the length of the shaft section is increased in cross wedge rolling.

In another embodiment of this method, it additionally comprises rolling of engagement structures onto one end of the shaft of the shaft section. The engagement structures may also be rolled by the cross wedge rolling method and serve to bring the finished valve into engagement with the wedge sections. In this operation, it is also possible to close the cavity at the same time and to roll any thickening of the end that is still present down to the shaft diameter or even to a diameter smaller than the shaft diameter. If the cavity was first filled with sodium as a coolant, it is no longer necessary to close the cavity later in a separate working step.

In one other embodiment of the method, the preform in cross wedge rolling is supported by the cross wedge rolling elements in parallel with and/or tangentially to a rolling movement. This makes it possible to ensure that the longitudinal axis of the preform will remain parallel to the cross wedge rolling axles and/or perpendicular to the direction of movement of the cross wedge rolling plates. This support makes it possible to ensure that the preform will retain its rotationally symmetrical shape until achieving the shape of the valve blank. Due to the support provided by the supporting elements, it is possible to ensure that the plane of the valve disk runs perpendicular to the shaft axis.

One embodiment of the method comprises at least two successive cross wedge rolling steps, preferably using two or more different cores. This embodiment makes it possible through a plurality of smaller shaping steps to reduce the load on the rollers and/or roller elements. In particular the wear on the cross wedge rollers and/or the cross wedge rolling elements can be reduced by the plurality of smaller shaping steps by cross wedge rolling. In this embodiment, it is possible in particular to greatly increase the lifetime of cross wedge rollers and/or cross wedge rolling elements.

Another embodiment of the present method additionally comprises a final machining of the disk valve blank(s) to form one or more disk valves. This step may be necessary if the surface properties or tolerances that are possible through machining cannot be achieved by rolling.

Another embodiment of the method additionally comprises coating of the disk valve blanks or disk valves with a surface coating. The surface coatings may comprise diamond-like carbon, ceramic coatings, galvanic coatings and the like.

In a method according to another embodiment, the cavity in the valve shaft is further filled with sodium and then closed. It is also possible to introduce a protective gas to prevent a reaction of the sodium with atmospheric oxygen. It is preferable to introduce the sodium into the cavity that is open toward the end of the shaft before rolling the thickened end of the shaft and thereby closing the cavity. It is additionally preferable for the sodium to be introduced into a valve blank, which still has a thickened shaft end. If there is a thickened shaft end, the diameter of the thickened shaft end can be reduced to the diameter of the shaft by an additional cross wedge rolling step. Furthermore, grooves for engagement of the wedge pieces for fastening of the valve springs can also be rolled into the end of the shaft in this cross wedge rolling step. This permits an almost chip-free method of manufacturing the disk valve, wherein a final machining may be necessary only if the required tolerances and surface qualities cannot be achieved merely through the rolling operations. The disk valve can be shaped rapidly, so that it very closely approximates the final shape by means of the cross wedge rolling technology, and therefore there are only minimal chips from machining and thus material can be saved.

In another embodiment of this method, the cavity extends into the disk section before cross wedge rolling, such that the cavity has a larger diameter than the subsequent shaft diameter. This configuration makes it possible for a cavity to remain in the valve head of the disk valve even after cross wedge rolling, such that the maximum diameter of the cavity is larger than the subsequent shaft diameter. Therefore, the present invention not only makes it possible to manufacture valves having a hollow shaft but also essentially a hollow valve head whose wall thickness is almost constant in the head area, and therefore a particularly large amount of coolant can be accommodated in the valve head. Such valves are also known as hollow head valves. The previous optimum with regard to weight reduction and dissipation of heat from the valve disk surface is achieved by a hollow head valve. The present invention thus also makes it possible to manufacture the best and most modern valves from the standpoint of the weight ratio.

According to another aspect of the present invention, a disk valve manufactured by one of the methods described above is made available.

Embodiments of the present invention are illustrated below on the basis of figures, which represent the manufacturing method on the basis of preforms and valve blanks in particular.

THE DRAWINGS

FIGS. 1 and 2 illustrate the basic method of cross wedge rolling according to the prior art.

FIG. 3 shows a preform, from which a valve blank can be produced by traditional cross wedge rolling.

FIG. 4 shows a valve blank of the type that can be produced by rolling from a preform as shown in FIG. 3.

DETAILED DESCRIPTION

Figure 5A:
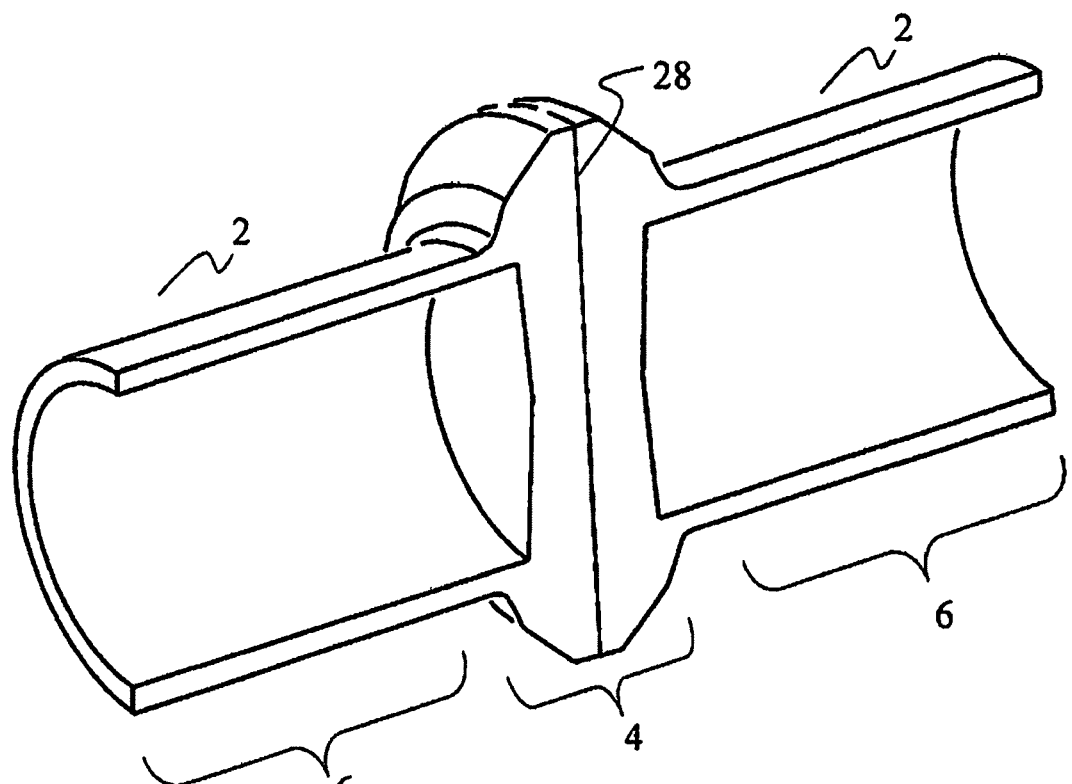
FIGS. 5A through 5C show a particular type of a double-valve preform and/or two valve preforms combined, which can be rolled together at the same time in a cross wedge rolling operation to form one double-valve blank or two valve blanks, wherein the valve blanks are embodied as hollow head valves.

In the following description as well as the figures, the same or similar reference notation is used to refer to the same or similar objects.

FIG. 1 shows two traditional cross wedge rollers 40, which definitely reduce the rolling gap between the rollers on their rolling surface by using cross wedges 42. A region of a reduced diameter is produced by rolling a workpiece 44 rotating between the cross wedge rollers. This shaping method makes it possible to save much more material in comparison with a machining method, such as turning on a lathe, because it does not produce any chips. Supporting elements and guides as well as the roller mill and the drives for the rollers are not shown for the sake of simplicity.

FIG. 2 shows a traditional method for cross wedge rolling using planar cross wedge rolling elements 46, wherein the cross wedge rolling elements 46 are each designed to execute straight movements relative to one another, and the wedge shape of the cross wedge rolling elements 46 creates the reduced diameter in the workpiece 44 by rolling.

FIG. 3 shows a preform or a valve preform 2, from which a valve blank can be produced by cross wedge rolling. The preform 2 comprises a disk section 4 as well as a shaft section 6. A cavity 8 in the shaft section 6 is indicated by a dashed line. The present method is aimed in particular at internally cooled valves, wherein the preform 2 is already provided with the cavity 8. However, it is also possible to shape the preform without a cavity by cross wedge rolling to form a valve blank without internal cooling.

FIG. 4 shows a valve blank 10, such as one that can be rolled starting from the preform 2 of FIG. 3. The shaft section 6 from FIG. 3 was shaped into the shaft 16, wherein the length of the shaft 16 is much greater than the length of the unrolled shaft section 6. A contour very close to the final contour can be achieved by cross wedge rolling. A further increase in length of the shaft can be achieved in rolling by using cores or supporting elements in the optional cavity. A final thickening can also be produced on one end of the shaft by cross wedge rolling. The wedge shape of the cross wedges exerts a force in the axial direction during rolling, which further facilitates the increase in length of the valve shaft. Sodium can easily be introduced as the coolant through the cavity 10, which extends through the thickening of the end and is open in the axial direction toward the end of the shaft. The thickening of the end can then be closed in an additional cross wedge rolling step (not shown), wherein retaining grooves can also be rolled in the valve shaft, preferably at the same time. The retaining grooves serve to bring the end of the valve shaft into engagement with conical parts. Therefore, an internally cooled valve can be manufactured almost completely by shaping to approximate the final dimensions and contour while leaving only a very small amount of material waste.

FIG. 5A shows a special type of double-valve preform and/or two valve preforms joined together so that they can be rolled simultaneously in a cross wedge rolling operation according to the invention to form one double-valve blank 20 according to the invention and/or two valve blanks according to the invention. Cross wedge valves have proven particularly suitable in rotationally symmetrical parts, which are additionally in mirror symmetry with respect to a plane running perpendicular to the axial direction of the component. The plane of symmetry is indicated by the dashed line 28, which is also a dividing line, along which the two rolled valve blanks can be separated. The forces generated by the wedges can be optimally introduced into a symmetrical workpiece. When working with workpieces having mirror symmetry, there is no risk of the workpiece being displaced in the direction of the axes of rolling during rolling, which could have a negative effect on the rolling results. The double-valve preform 20 is shaped by cross wedge rolling and then the two valve blanks joined at the valve disks are separated by cutting them on a lathe. The double-valve preform 20 as well as two valve preforms 2 that have been joined together make it possible to use symmetrical cross wedge rollers 40 or symmetrical cross wedge rolling elements 46, which thus constitutes an important simplification of the process technology. Furthermore, at the same time, the double-valve preform 20 also makes it possible to manufacture an intake valve and an exhaust valve by cross wedge rolling. The dimensions of intake and exhaust valves differ slightly but they allow almost symmetrical cross wedge rolling. Another advantage is that most engines have an equal number of intake valves and exhaust valves, so that retrofitting times for switching from intake valve production to exhaust valve production can be eliminated by the present method.

It can be seen in FIG. 5A that the diameter of the shaft section 6 and of the cavity therein are very large in comparison with the diameter of the valve head section.

Figure 5B:
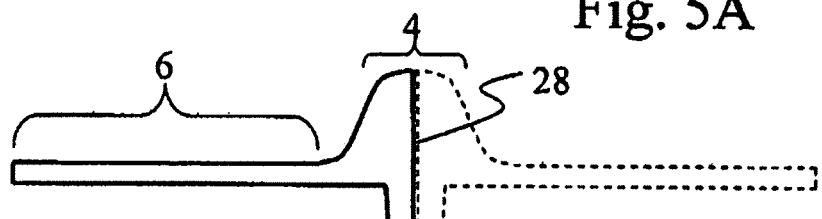

FIG. 5B again shows the valve preform 2 in a sectional view. According to the invention, the cavity extends up to the area that will subsequently become the valve disk surface. In FIG. 5B, reference numeral 28 again denotes a dividing line along which two valve preforms can be joined and/or along which a double-valve preform can be divided into two valve blanks after cross wedge rolling.

Figure 5C:
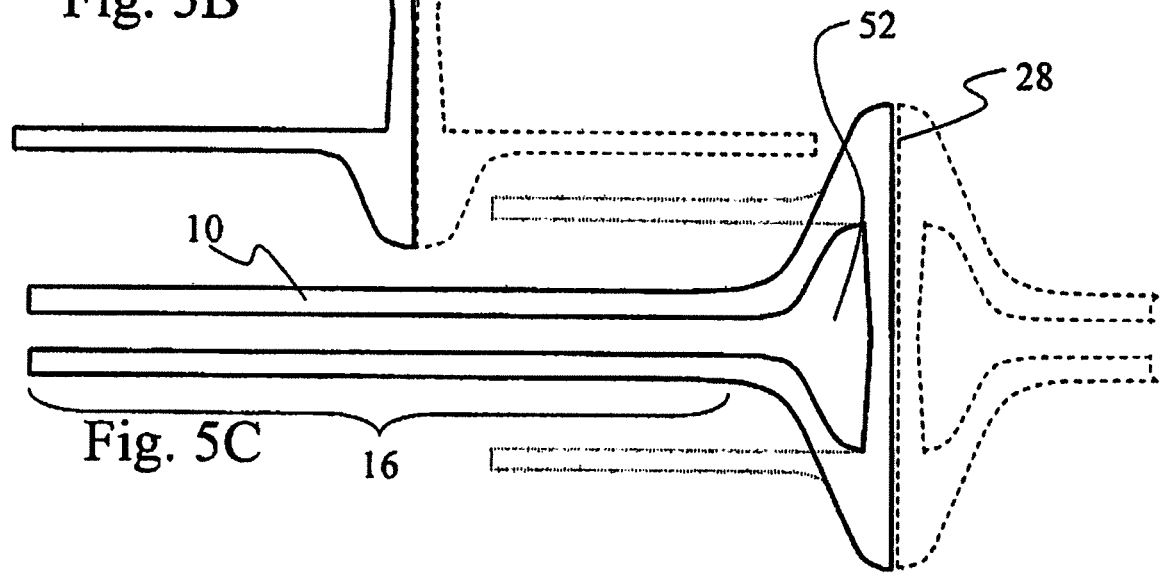

FIG. 5C shows the valve preform 2 from FIG. 5B again in dotted lines to better illustrate the shaping. The diameter of the shaft section has been reduced considerably and the length of the shaft section has been increased significantly. The diameter of this shaft section at the valve head is not reduced greatly by rolling, so that according to the invention, the cavity is still present almost with its original diameter. This shows that hollow head valves can also be manufactured easily by cross wedge rolling. The dashed line here also indicates that two valve preforms can be manufactured at the same time by cross wedge rolling. However, it is also possible to use a double-valve preform to simultaneously manufacture two hollow head valves and/or hollow valve blanks, which can be separated along the dividing line 28 after cross wedge rolling.

Figure 6:
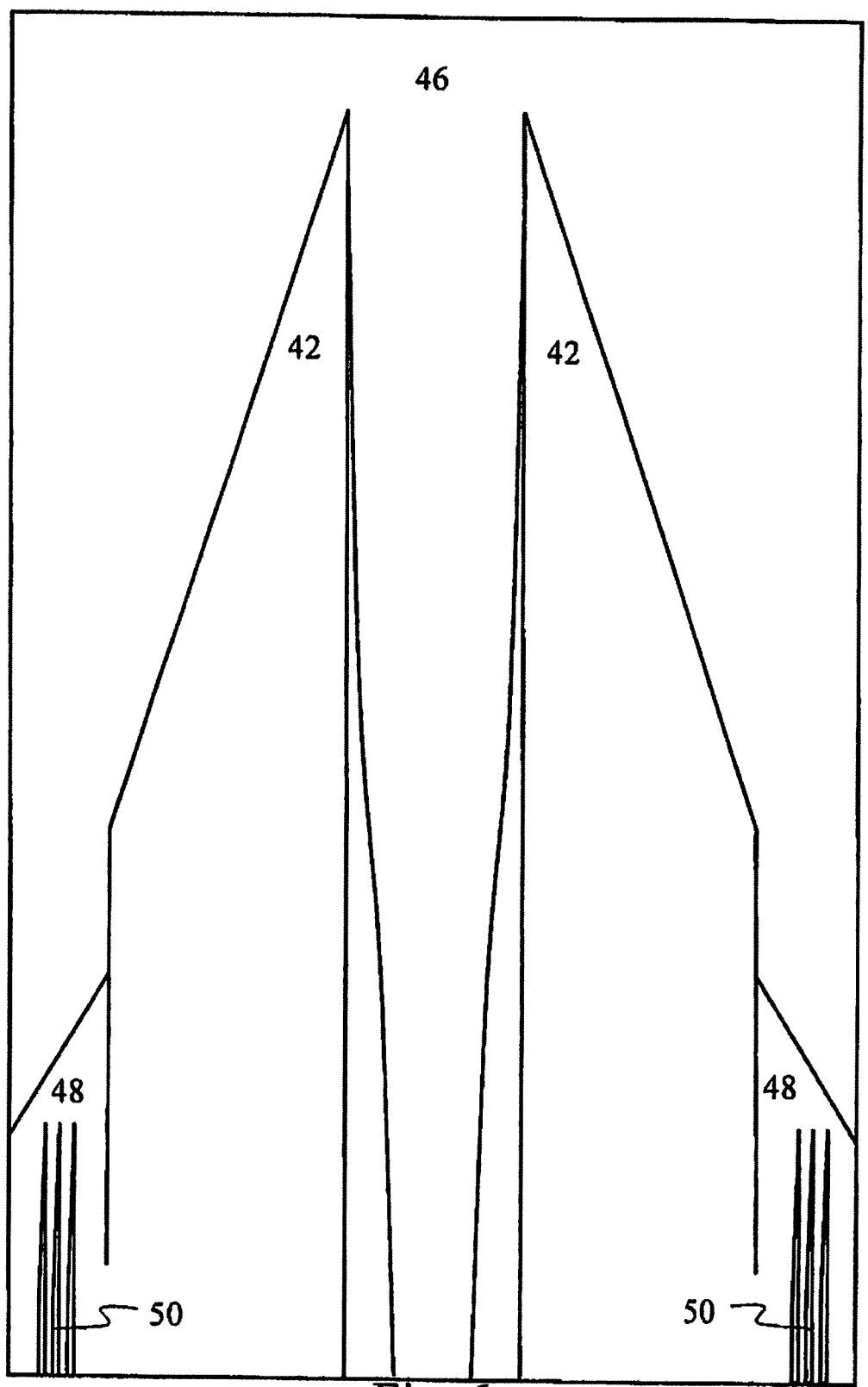
FIG. 6 shows a cross wedge rolling element with which the double valve preform according to FIG. 5 can be shaped to form two valve blanks.

FIG. 6 shows a top view of a cross wedge rolling element 46 with which the double-valve preform 20 from FIG. 5 can be shaped into two valve blanks according to the invention and/or one double-valve blank according to the invention. The double-valve preform 20 is rolled from top to bottom over the surface, first encountering two first wedges 42, which roll out the shaft sections to form the respective shafts. Sodium can be introduced into a cavity in the valve shafts in a transitional region where the valve disks are shaped. Further below, the wedge is guided further to a wedge step 48 to roll the thickened end of the shaft to a given shaft diameter. In addition, three additional groove wedges 50, which should roll retaining grooves into the end of the shaft, are arranged on each side. The retaining grooves make it possible in addition to ensure that the cavity will be sealed at the end of the shaft by the shaft end thickening pressed together, so that the sodium that has been introduced into the cavity is enclosed therein in an airtight closure.

The invention claimed is:

1. A method for manufacturing two disk valves each having a hollow shaft section and a hollow valve head, comprising cross wedge rolling a preform having two disk sections and two shaft sections to form two preforms each having one disk section and one shaft section forming a disk valve blank, wherein each of the shaft sections of the preforms has a cavity that is open toward one end of the shaft section and wherein at least one core is arranged in each one of the shaft section cavities, preventing each of the shaft section cavities from being compressed during the cross wedge rolling and ensuring that a length of each of the shaft sections are increased by the cross wedge rolling, wherein each of the shaft section cavities, before the cross wedge rolling, extends into a respective disk section and just up to a subsequent valve disk surface, and wherein the cavity of each of the shaft sections before the cross wedge rolling has a larger diameter than a subsequent diameter of the shaft section after the cross wedge rolling, so that a disk valve having a hollow valve head is obtained after the cross wedge rolling.

2. The method for manufacturing disk valves according to claim 1, wherein the method further comprises separating the disk sections from one another after the cross wedge rolling.

3. The method according to claim 1, additionally comprising rolling engaging structures into one end of the shaft section in order to engage with wedge parts.

4. The method according to claim 1, additionally comprising support of the preform during the cross wedge rolling, in parallel or tangential to rolling movement of cross wedge rolling elements.

5. The method according to claim 1, comprising two successive cross wedge rolling steps, wherein two different cores are used.

6. The method for according to claim 1 additionally comprising final machining of the disk valve blanks to form disk valves.

7. The method for according to claim 1, additionally comprising coating of the disk valve blanks or the disk valves.

8. The method for manufacturing disk valves according to claim 1, additionally comprising filling the cavities with sodium and closing the cavities.

9. The method according to claim 2, wherein the method further comprises machining the surface of the cross wedge rolled preform after the cross wedge rolling and separating the disk sections from one another after the machining.

* * * * *